US009827982B2

(12) United States Patent
Owen et al.

(10) Patent No.: US 9,827,982 B2
(45) Date of Patent: Nov. 28, 2017

(54) VEHICLE STEERING

(71) Applicant: JAGUAR LAND ROVER LIMITED, Whitley, Coventry, Warwickshire (GB)

(72) Inventors: Simon Owen, Coventry (GB); Karl Richards, Coventry (GB); Andrew Maskell, Coventry (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 34 days.

(21) Appl. No.: 14/779,180

(22) PCT Filed: Jan. 17, 2014

(86) PCT No.: PCT/EP2014/050935
§ 371 (c)(1),
(2) Date: Sep. 22, 2015

(87) PCT Pub. No.: WO2014/146806
PCT Pub. Date: Sep. 25, 2014

(65) Prior Publication Data
US 2016/0046287 A1    Feb. 18, 2016

(30) Foreign Application Priority Data

Mar. 22, 2013    (GB) .................. 1305267.5

(51) Int. Cl.
A01B 69/00    (2006.01)
B62D 6/00    (2006.01)
(Continued)

(52) U.S. Cl.
CPC .......... B60W 30/045 (2013.01); B60W 10/04 (2013.01); B60W 10/20 (2013.01);
(Continued)

(58) Field of Classification Search
CPC .... B60W 30/045; B60W 10/04; B60W 10/20; B60W 50/082; B60W 30/18145;
(Continued)

(56) References Cited

U.S. PATENT DOCUMENTS 8,483,926 B2 *   7/2013   Shiozawa ................. B60L 3/10
                                                       303/150
2002/0060103 A1   5/2002   Ritz et al.
(Continued)

FOREIGN PATENT DOCUMENTS

DE    102010028486 A1    11/2011
DE    102011015509 A1    1/2012
(Continued)

OTHER PUBLICATIONS

Slavnich; D.,: "Honda Talks the Torque", Automotive Engineer, Professional Engineering Publishing, London, GB, vol. 29, No. 5, May 1, 2004, p. 60.
(Continued)

Primary Examiner — Jaime Figueroa
(74) Attorney, Agent, or Firm — Reising Ethington P.C.

(57) ABSTRACT

A motor vehicle control system operable in a steering assist mode in which the system is configured to: detect steering angle; and control a distribution of torque to one or more wheels of the vehicle in dependence on the detected steering angle thereby to induce a turning moment in the direction of turn indicated by the steering angle.

20 Claims, 7 Drawing Sheets

(51) Int. Cl.

| | | |
|---|---|---|
| *B62D 11/00* | (2006.01) | |
| *B62D 12/00* | (2006.01) | |
| *B63G 8/20* | (2006.01) | |
| *B63H 25/04* | (2006.01) | |
| *G05D 1/00* | (2006.01) | |
| *G06F 7/00* | (2006.01) | |
| *G06F 17/00* | (2006.01) | |
| *G06F 19/00* | (2011.01) | |
| *B60W 30/045* | (2012.01) | |
| *B60W 50/08* | (2012.01) | |
| *B60W 30/18* | (2012.01) | |
| *B60W 10/04* | (2006.01) | |
| *B60W 10/20* | (2006.01) | |

(52) U.S. Cl.
CPC .... *B60W 30/18145* (2013.01); *B60W 50/082* (2013.01); *B60W 2520/14* (2013.01); *B60W 2540/18* (2013.01); *B60W 2550/00* (2013.01); *B60W 2710/202* (2013.01); *B60W 2720/10* (2013.01); *B60W 2720/406* (2013.01)

(58) Field of Classification Search
CPC ......... B60W 2720/10; B60W 2550/00; B60W 2710/202; B60W 2540/18; B60W 2520/14; B60W 2720/406
USPC ...................................................... 701/1, 43
See application file for complete search history.

(56) References Cited

U.S. PATENT DOCUMENTS

| | | | |
|---|---|---|---|
| 2004/0019417 A1* | 1/2004 | Yasui | B60G 17/0195 701/36 |
| 2006/0074541 A1* | 4/2006 | Ono | B60T 8/172 701/80 |
| 2009/0005931 A1 | 1/2009 | Komatsu | |
| 2010/0114449 A1* | 5/2010 | Shiozawa | B60L 3/10 701/90 |
| 2010/0191423 A1* | 7/2010 | Koyama | B60W 30/09 701/42 |
| 2011/0209521 A1* | 9/2011 | Shiozawa | B60L 3/102 73/9 |
| 2011/0257826 A1 | 10/2011 | Yu et al. | |
| 2012/0158257 A1 | 6/2012 | Stursa et al. | |

FOREIGN PATENT DOCUMENTS

| | | |
|---|---|---|
| GB | 2499461 A | 8/2013 |
| JP | 2010255637 A | 11/2010 |
| KR | 1020070104055 A | 10/2007 |
| KR | 1020130017728 A | 2/2013 |
| WO | 2004106101 A1 | 12/2004 |

OTHER PUBLICATIONS

International Search Report for application No. PCT/EP2014/050935 dated Jul. 15, 2014, 8 pages.
GB Combined Search and Examination Report for corresponding application No. GB1305267.5, dated Sep. 17, 2013, 5 pages.
Written Opinion for application No. PCT/EP2014/050935 dated Jul. 15, 2014, 9 pages.

* cited by examiner

VEHICLE STEERING

FIELD OF THE INVENTION

This invention relates to vehicle steering and particularly, but not exclusively, to steering in low traction conditions such as mud or snow. Aspects of the invention relate to a method, to a system and to a vehicle.

BACKGROUND

Vehicle steering relies upon friction between the vehicle tyres and the ground. Where high levels of friction are available, such as in normal highway driving, understeer and oversteer are seldom encountered. However where friction is reduced, as in mud or snow, the rate of turn of a vehicle may vary substantially from that indicated by steering angle, and in consequence the vehicle may understeer or oversteer.

In such circumstances, the experience of the vehicle driver plays an important part in retaining control of the vehicle and achieving the intended rate of turn.

A vehicle may include a cruise control mode whereby a pre-set speed is maintained regardless of topography. Cruise control systems are widely used in highway driving, generally above about 30 kph, where steering angles are typically small. Autonomous cruise control (ACC) systems permit one vehicle to follow another at a pre-determined separation whilst accommodating speed variations of the leading vehicle.

Off-road speed control has been proposed whereby a vehicle may maintain a pre-set speed over variable terrain. Such a system has the advantage that the vehicle driver, particularly a novice driver, can concentrate upon steering whilst allowing vehicle systems to automatically select a suitable transmission ratio and engine speed. Thus the work rate of the vehicle driver may be substantially reduced. However in the case of high steering angles on low friction surfaces some side slip (understeer) may occur, so that the vehicle does not follow the intended path. An inexperienced driver may not know how to best control the vehicle in such circumstances, in order to make progress whilst avoiding risk or damage.

Mere disengagement of an off-road speed control mode in difficult conditions places the inexperienced driver under a greater workload, since engine speed and transmission ratio must be controlled in addition to steering.

When negotiating rutted terrain in slippery conditions, where both left and right-hand wheels may follow respective ruts of a track, a vehicle may become trapped in the ruts. The vehicle may be unable to gain sufficient traction to climb out of the ruts.

It is desirable to provide an improved system and method to assist a driver during off-road vehicle operations.

SUMMARY OF THE INVENTION

Embodiments of the invention may be understood with reference to the appended claims.

Aspects of the present invention provide a control system, a vehicle and a method.

In one aspect of the invention for which protection is sought there is provided a control system operable in a steering assist mode in which the system is configured to:
 detect steering angle; and
 control a distribution of torque to one or more wheels of the vehicle in dependence on the detected steering angle thereby to induce a turning moment in the direction of turn indicated by the steering angle.

Reference to detection of steering angle includes reference to receiving a signal corresponding to or indicative of steering angle.

Embodiments of the present invention have the feature that the system may control the distribution of torque in a manner such as to introduce a turning moment on the vehicle in the direction of turn indicated by the detected steering angle The steering angle may correspond to an instantaneous steering wheel angle, an instantaneous steerable road wheel angle or other indicator of vehicle steering angle.

As will be discussed in more detail below, control of powertrain torque distribution may be accomplished by torque vectoring whereby distribution torque between axles and/or between respective left and right wheels is controlled. In some embodiments a stability control system (SCS) may be employed to deploy braking and/or torque vectoring to induce a turning moment. A traction control system (TCS) may be employed in some embodiments. The TCS may form part of a vehicle SCS in some embodiments.

The system may be operable in a first speed control mode in which the system automatically causes the vehicle to travel at a speed in dependence upon a value of a set-speed parameter corresponding to a speed the vehicle is to be intended to maintain.

In the first speed control mode, which may be particularly configured for use in off-highway environments, the system may be configured automatically to maintain a selected vehicle speed regardless of topography. Furthermore, in the speed control mode the system may be configured to manage wheel slip whilst attempting to maintain a speed corresponding to the set-speed parameter. Thus, the speed control mode may differ from conventional cruise control systems in that the speed control mode is not cancelled upon detection of wheel slip.

The system may continue to operate in the first speed control mode during the distribution of torque by said system. The system may be operable to select the steering assist mode automatically when the system assumes the first speed control mode. The value of the set-speed parameter may be set by a user.

The system may be further operable is a second alternative speed control mode in which the control a distribution of torque to one or more wheels of the vehicle in dependence on the detected steering angle thereby to induce a turning moment in the direction of turn indicated by the steering angle, causes a cancellation of the second speed control mode. The seconds speed control mode may be a standard on-highway cruise control mode, or on-highway adaptive cruise control mode, as is known in the art. When operating in the second speed control mode any intervention of the system to cause a change in torque at the wheels in dependence upon steering wheel input results in the cancellation of the second speed control mode. When driving on highway where the surface friction is typically high wheel slip, which will cause a deviation from the intended turning circle is undesirable as it indicates that the vehicle is being operated at a speed outside of safe working parameters and therefor an automatic application of torque, for example from the cruise control system trying to maintain or achieve a target set-speed is undesirable. In contrast, when driving off road many off road environments will have a lower surface friction that highways, for example sand, snow, mud etc. and therefore wheel slip that will affect the turning response of the vehicle is to be accepted. Therefore if using the first speed control system it is desirable that in these circumstances that speed control is not cancelled as a result of any torque distribution to assist the vehicle turning.

Preferably the first speed control mode controls the speed within a first range of set speeds and wherein the second speed control mode controls the speed of the vehicle within a second range of set speeds.

Advantageously the system may be operable to allow a user to select and deselect the steering assist mode.

The system may be operable automatically to select the steering assist mode in dependence on a correspondence threshold between steering angle and a current rate of turn of the vehicle.

When in the steering assist mode the system may be operable to control distribution of torque in dependence on steering angle regardless of whether understeer is detected. The system may continue to provide steering assistance until the steering assist mode is cancelled or deselected.

Further advantageously the system may be operable automatically to select the steering assist mode when a difference between rate of turn and expected rate of turn for a given steering angle exceeds a prescribed threshold over a prescribed threshold distance of travel.

The system may be operable automatically to select the steering assist mode when a difference between rate of turn and expected rate of turn for a given steering angle exceeds a prescribed threshold for a prescribed threshold time period.

The values of said thresholds may be different in the first speed control mode and in the second speed control mode. In this manner the greater wheel slip or deviation between theoretical turn angle and actual turn angle can be allowed in one speed control compared to the other. In one arrangement deviations are allowed in the first speed control mod compared to the second speed control mode.

In an alternative arrangement the values of the thresholds are different in a first mode of operation in which the vehicle is configured for off-highway driving, and in a second mode of operation in which the vehicle is configured for off-highway driving, in combination with or irrespective of any selected speed control modes.

The system may be operable to control the distribution of torque in dependence on the detected steering angle by reducing an amount of net torque applied to an inside wheel with respect to a direction of intended turn.

By reduction in the amount of net torque is meant that the amount of net torque is made less positive or more negative. Thus, if the net torque applied is initially 50 Nm, the amount of torque may be reduced to 25 Nm, 0 Nm, −25 Nm or any other required value that is less than 50 Nm. If the amount of net torque is −10 Nm, the amount may be reduced to −20 Nm, −40 Nm or any other suitable value.

The system may be operable to control the distribution of torque in dependence on the detected steering angle by reducing an amount of net torque applied to an inside trailing wheel with respect to a direction of intended turn.

By reducing the amount of net torque applied to the inside wheel, in particular an inside trailing wheel, assistance may be provided to steerable road wheels to enable turning. The inside trailing wheel may therefore assist one or more leading steerable wheels to gain increased traction and turn the vehicle. Thus, in vehicles having driven leading and trailing wheels, torque to leading steerable wheels may remain substantially equal. The leading steerable wheels may have torque applied thereto so as to assist vehicle progress whilst torque distribution between the trailing wheels is arranged to induce a turning moment in the direction of the steering angle.

In some embodiments, steering assistance provided only by control of torque applied to trailing wheels, for example by increasing net drive torque to an outside trailing wheel and/or reducing net drive torque to an inside trailing wheel. In some embodiments steering assistance is provided only by reducing a net drive torque at an inside trailing wheel, accomplished by reduction in drive torque and/or application of brake torque.

Some embodiments of the present invention have the feature that the system may be configured to continue to provide steering assistance in this manner independently of the actual amount of understeer present.

Some embodiments of the present invention may be operable to counter oversteer in a corresponding manner by inducing a turning moment in a direction against the steering angle.

It is to be understood that embodiments of the present invention may be particularly useful in situations where one or more steerable leading road wheels are experiencing difficulty gaining sufficient traction to exit a rut, for example a rut formed by a vehicle that has previously negotiated the terrain.

The system may be operable to control the distribution of torque in dependence on the detected steering angle at least in part by reducing an amount of positive drive torque applied to an inside wheel with respect to a direction of intended turn.

The system according to claim 8 operable to control the distribution of torque in dependence on the detected steering angle at least in part by reducing an amount of positive drive torque applied to an inside trailing wheel.

The system may be operable to control the distribution of torque in dependence on the detected steering angle at least in part by reducing the amount of positive drive torque applied to an inside wheel and applying a braking torque thereto.

The system may be operable to control the distribution of torque in dependence on the detected steering angle at least in part by application of brake torque to an inside wheel.

Optionally, the system may be operable to control the distribution of torque in dependence on the detected steering angle at least in part by application of brake torque to an inside trailing wheel.

The system may be operable to detect when a vehicle has passed the same portion of a route more than once with a steering angle exceeding a prescribed value with respect to a direction of travel of the vehicle, the system being operable to provide an indication to a driver of a location along said portion of the route at which an amount of understeer was reduced relative to other locations of said route when the vehicle previously negotiated that portion.

The system may be operable to provide said indication only if the system detects that the vehicle is negotiating that portion of the route within a prescribed time period of the previous occasion.

The indication may be provided in the form of an audible and/or visual indication when the vehicle is substantially at the location. Alternatively or in addition the indication may be provided in advance of arrival. Other indications are also useful.

In a further aspect of the invention for which protection is sought there is provided a vehicle comprising a control system according to a preceding aspect.

In another aspect of the invention for which protection is sought there is provided a method of controlling a motor vehicle comprising:

detecting a steering angle; and controlling a distribution of torque to one or more wheels of the vehicle in dependence on the detected steering angle thereby to induce a turning moment in the direction of turn indicated by the steering angle.

In some embodiments the system may include a speed control system operable at low speeds only.

In some embodiments the speed control system may be operable only at speeds below around 50 kph although other values are also useful. Similarly, steering assistance may be available only below a prescribed threshold speed. The speed at which speed control and/or steering assistance is available may be determined by one or more settable thresholds of vehicle speed or by engagement of, for example, a low range in a vehicle transmission. In some embodiments speed control and/or steering assistance may be automatically enabled upon selection of a low range, and the low range may be manually or automatically selected.

It is to be understood that some embodiments of the invention may rely upon an iterative approach, and sample the inputs of steering angle and current rate of turn at an appropriate refresh rate, for example 10 Hz or greater. The speed of rotation of individual wheels may be directly controlled, by braking, or may be adjusted by directing more or less torque to the relevant wheel driveshaft. Torque variation may rely upon automatically increasing engine output torque and/or by using techniques of biasing torque to one or more vehicle axles, or to one or other wheel side of a single axle. Torque bias may for example be achieved by controlling one or more differential gears so that the output shafts thereof deliver different torques to the respective wheels. This torque may be redistributed between driven wheels of the vehicle, and the available torque may be automatically increased or reduced by adjustment of the torque output of the vehicle motor. The vehicle motor may be an internal combustion engine, an electric motor or a combination thereof.

Methods according to embodiments of the present invention are also applicable to vehicles having electric wheel motors.

Aspects of the present invention are applicable to both on-road and off-road driving, and may be implemented automatically by a vehicle system upon detection of certain adverse conditions as noted above. Alternatively, or in addition, a method according to an embodiment of the invention may be selected or de-selected manually by a vehicle driver.

Adverse conditions may be any circumstance in which side slip is present or is predicted. Such conditions may be detected automatically by on-board vehicle systems, and include for example detection of wheel slip, and failure of the vehicle to follow a prescribed path, for example a path corresponded to the detected steering angle. In each case the adverse condition may be subject to a threshold being exceeded, for example wheel slip exceeding a predetermined percentage, and the threshold may be variable depending on the terrain or upon driver implementation of a terrain mode of the vehicle.

Thus an off-road mode may be automatically detected or manually selected, and in consequence certain thresholds for implementation of a method according to an embodiment of the invention may be determined. The thresholds may be determined for example from a look-up table in an electronic memory. Different thresholds may apply for different off-road terrain conditions, such as sand, mud, snow or rocks, or different on road driving modes, e.g. a sports mode or a normal mode—and these terrains or driving modes may be detected automatically by a suitable on-board vehicle system, or may be selected by the driver. Furthermore different thresholds may apply for the low speed progress control and the standard cruise control modes of operation.

In the case of on-road low speed driving, where wheel slip is typically very low, the speed of individual vehicle wheels may be monitored. These speeds may be compared with steering angle to ensure that they remain within a narrow permissible range (it being understood that inside wheels turn more slowly than outside wheels during cornering). A plurality of wheel speeds may be interpolated to allow determination of vehicle speed. In the event understeer is detected that exceeds a prescribed amount, the control system may control wheel torque distribution in order to induce a turning moment in the direction of turn indicated by the steering angle in the manner described above.

In the case of off-road driving, significant wheel slip may occur and accordingly an alternative vehicle speed reference may be desirable.

In one embodiment, vehicle reference speed is determined without reference to vehicle wheel speed(s), for example by use of GPS positioning, fixed object radar, sonar laser, camera recognition of terrain passing under the vehicle, or any other suitable technique, or any combination of these techniques. One or more accelerometers may be employed to determine vehicle speed in some embodiments.

In one embodiment, a method according to an embodiment of the present invention comprises a closed loop control system. In one embodiment, one or more inside wheels of the vehicle is braked to counter understeer. Such braking may be incorporated within a closed loop control system, whereby the theoretical and current rates of turn are continually compared, braking being applied in proportion to the deviation to be corrected. Closed loop control may operate at any suitable refresh rate, for example 10Hz or greater. In an embodiment, braking is applied to a trailing inside wheel to counter understeer. A leading inside wheel may be substantially unbraked. In an embodiment the application of torque to an inside leading wheel by a powertrain may be reduced, and in some embodiments substantially suspended, to reduce slip.

The embodiments of the present invention allow a speed control (or cruise control) mode to be adopted, so that the driver can concentrate on steering the vehicle whilst maintaining progress in challenging terrain.

The theoretical rate of turn of a vehicle may be represented as a vehicle body yaw and side slip, which can be mapped to the slip angles and speeds of individual wheels. If required, an instant reference position of the vehicle may repeatedly or continuously be provided by any known technique, for example by GPS positioning, fixed object radar, sonar, laser, or camera recognition of terrain passing under the vehicle. Reference position may be useful in some applications of the invention.

The expected vehicle yaw rate, as a consequence of steering angle, may be repeatedly compared with an actual (measured) yaw rate in order to determine side slip, and thus to permit calculation of a correction factor whereby torque distribution is adjusted.

Vehicle speed may be determined by an averaging technique of the rotational speeds of two or more vehicle wheels, for example in conjunction with the reference position techniques noted above. The averaging technique may be applied to undriven wheels and/or to non-steering wheels.

However it will be understood that vehicle speed, as such, is optional, and not a necessary input for correcting understeer according to embodiments of the present invention.

Embodiments of the present invention allow for optimised steering response by providing that torque distribution to individual driven wheels is appropriate to the steering angle, and particularly where the steering wheels are driven. The vehicle driver retains full control of steering, and the vehicle automatically forces appropriate torque distribution by braking, or by applying more or less drive torque to the intent that the desired vehicle path is followed, particularly in low speed off-road conditions where cruise control is activated. In some embodiments a driveline torque modulation and/or disconnect system may be arranged to control a distribution of torque between front and rear axles.

Embodiments of the present invention have the advantage that they may reduce tyre wear, due to restricting unnecessary wheel spinning as a result of excess drive torque, and degradation of terrain caused by spinning wheels.

In an embodiment of the invention, a hybrid vehicle may provide increased torque to one or more wheels via an electric traction motor, in order to supplement torque generated by an internal combustion engine.

In one embodiment an electronic control unit (ECU) of the vehicle determines a target speed according to a cruise control input, detects an instant steering angle, and calculates an expected rate of change of yaw angle of the vehicle on the assumption that sufficient friction is available to permit the vehicle wheels to follow the path dictated by the steering angle. The expected rate of change of yaw angle is compared with a detected rate of change of yaw angle, and convergence is initiated by controlling an amount of torque applied to wheels of the vehicle to induce a turning moment corresponding to the expected rate of change of yaw angle.

In another embodiment, the ECU determines the theoretical individual wheel speeds required for a prescribed rate of turn corresponding to the instant steering angle, and compares these theoretical wheel speeds with actual wheel speeds. An amount of torque applied to individual wheels of the vehicle is then controlled to ensure convergence, by braking or directing increased torque to the or each respective wheel driveshaft.

Vehicle yaw rate may be sensed by any suitable technique, including GPS, fixed object radar, camera recognition of terrain and on-board accelerometers or a gyro. Wheel speed may be determined in any conventional manner, including use of systems associated with anti-lock braking.

In one embodiment, a method according to an embodiment of the present invention is implemented in response to detection of an off-road condition, for example by reference to selection of an off-road vehicle operating condition, selection of a low transmission range, selection of a raised suspension setting, or detection of high suspension travel. Embodiments of the present invention may also be implemented upon detection of wading by a suitable wading sensor.

A low coefficient of friction between a wheel and driving surface may be indicated by wheel slip of greater than 20%. Other values are also useful.

Methods according to the present invention may provide a closed loop control system in which steering control may be achieved by determining a current rate of turn of the vehicle, and controlling individually a torque distribution between driven wheels such that the current (real time, i.e. instant) rate of turn approaches the theoretical rate of turn. In particular, in some embodiments an amount of torque developed at one or more trailing wheels may be controlled such that a differential in net torque between trailing wheels on left and right-hand sides of the vehicle exists so as to induce a turning moment on the vehicle, whilst an amount of net torque developed by respective left and right leading wheels is substantially equal to one another. In some embodiments, the differential in net torque between the trailing wheels is achieved by controlling a powertrain and/or braking system to reduce a net amount of positive drive torque applied to an inside trailing wheel, optionally to develop a net negative torque at the inside trailing wheel.

Methods according to embodiments of the present invention may also be used in combination, so that a plurality of conditions may require to be met for implementation of the method. For example a speed control system (such as a cruise control system or low speed cruise control system) may be required to be active and a low friction surface detected (or low friction driving mode selected). Alternatively, a required combination may be that a speed control system has been selected and a 'low range' mode of operation of a powertrain of selected. More than two conditions may apply in a desirable combination, which may be vehicle specific.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment or aspect are applicable to all embodiments, unless such features are incompatible.

BRIEF DESCRIPTION OF THE DRAWINGS

Embodiments of the invention will now be described, by way of example only, with reference to the accompanying drawings, in which.

DETAILED DESCRIPTION

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function block is made for ease of explanation of the manner of operation of the controller.

Figure 1:
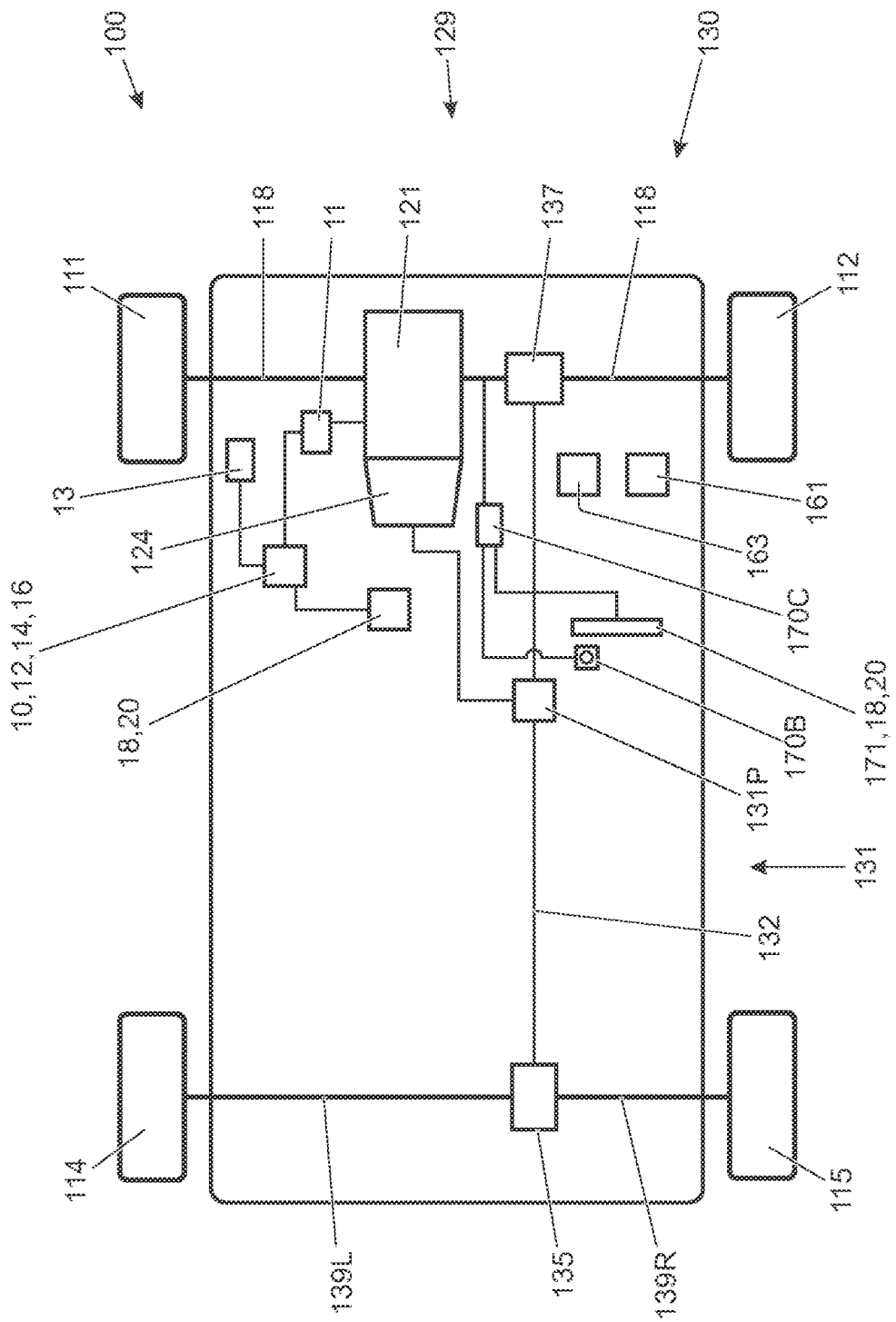
FIG. 1 is a schematic illustration of a vehicle according to an embodiment of the invention in plan view.
Figure 2:
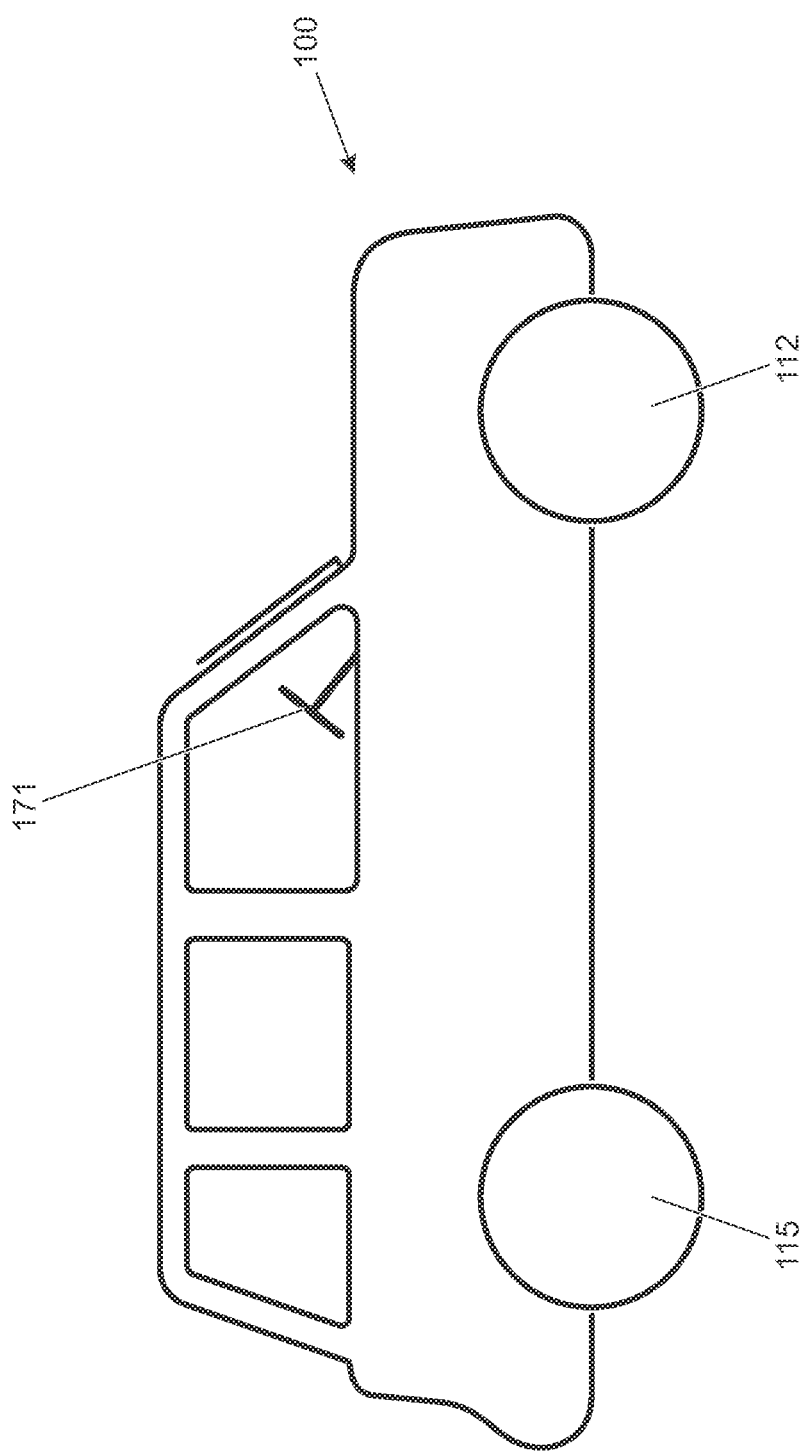
FIG. 2 shows the vehicle of FIG. 1 in side view.

FIG. 1 shows a vehicle 100 according to an embodiment of the invention having a powertrain 129. The powertrain 129 includes an engine 121 that is connected to a driveline 130 having an automatic transmission 124. Embodiments of the present invention are suitable for use in vehicles with manual transmissions, continuously variable transmissions or any other suitable transmission.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear drive unit (RDU) 135 and a pair of rear driveshafts 139L, 139R.

Embodiments of the present invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles.

In the embodiment of FIG. 1 the transmission 124 is releasably connectable to the auxiliary driveline portion 131 by means of a power transfer unit (PTU) 131P, allowing selectable two wheel drive or four wheel drive operation. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
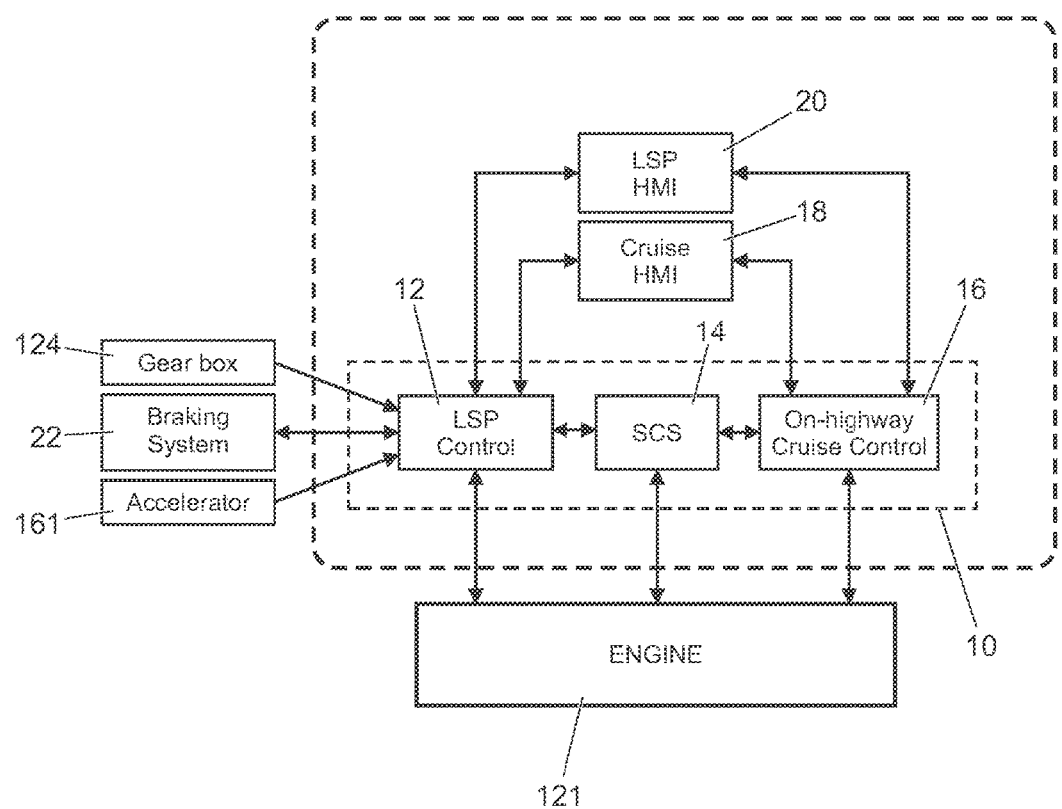
FIG. 3 is a high level schematic diagram of an embodiment of the vehicle speed control system of the present invention, including a cruise control system and a low-speed progress control system.

A control system for the vehicle engine 121 includes a central controller, referred to as a vehicle control unit (VCU) 10, a powertrain controller 11, a brake controller 13 and a steering controller 170C. The brake controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3 and a stability control system (SCS) 14, the latter being a known component of existing vehicle control systems. The SCS 14 improves the safety of the vehicle 100 by detecting and managing loss of traction. When a reduction in traction or steering control is detected, the SCS 14 is operable automatically to command a brake controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the brake controller 13. Further alternatively, the SCS 14 may be implemented by a separate controller.

Although not shown in detail in FIG. 3, the VCU 10 further includes a Dynamic Stability Control (DSC) function block, a Traction Control (TC) function block, an Anti-Lock Braking System (ABS) function block and a Hill Descent Control (HDC) function block. These function blocks are implemented in software code run by a computing device of the VCU 10 and provide outputs indicative of, for example, DSC activity, TC activity, ABS activity, brake interventions on individual wheels and engine torque requests from the VCU 10 to the engine 121 in the event a wheel slip event occurs. Each of the aforementioned events indicate that a wheel slip event has occurred. Other vehicle sub-systems such as a roll stability control system or the like may also be useful.

Figure 6:
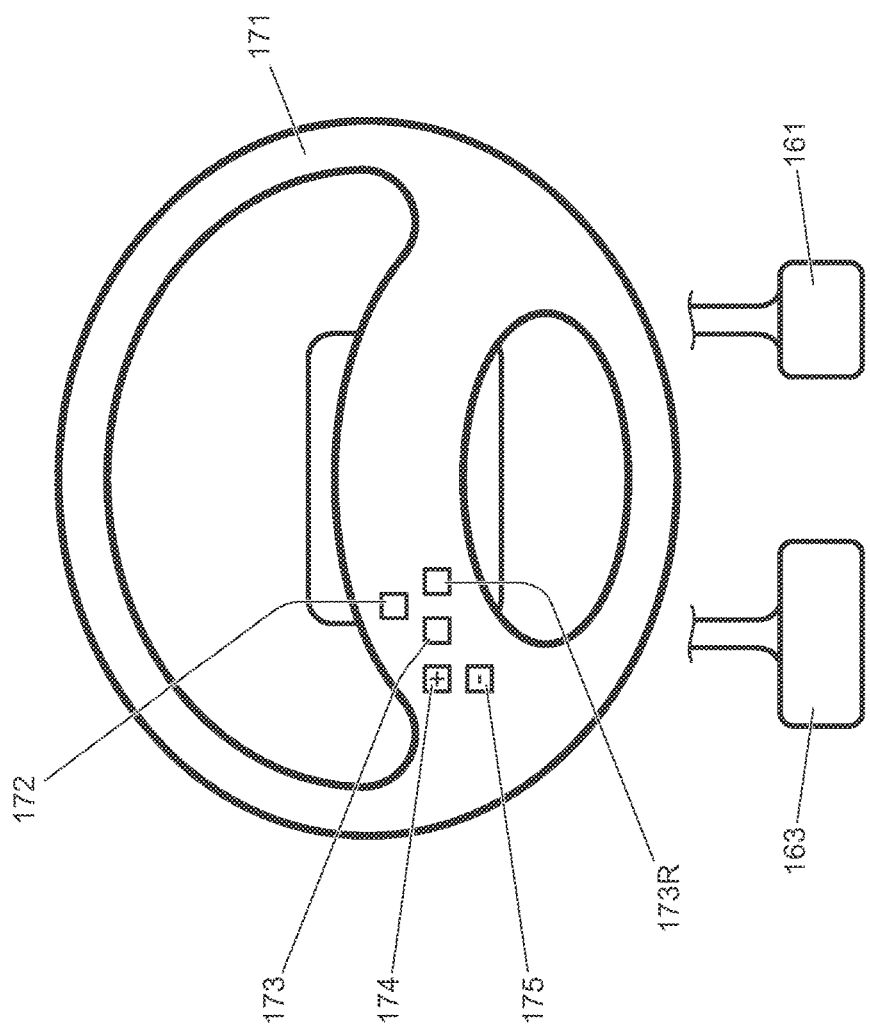
FIG. 6 illustrates a steering wheel and brake and accelerator pedals of a vehicle according to an embodiment of the present invention.

The vehicle 100 also includes a cruise control system 16 which is operable to automatically maintain vehicle speed at a selected speed when the vehicle is travelling at speeds in excess of 30 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 6). Depression of a 'set-speed' control 173 sets the set-speed to the current vehicle speed. Depression of a '+' button 174 allows the set-speed to be increased whilst depression of a '−' button 175 allows the set-speed to be decreased. In some embodiments, if the cruise control system 16 is not active when the '+' button 174 is depressed, the cruise control system 16 is activated.

The cruise control system 16 monitors vehicle speed and any deviation from the target vehicle speed is adjusted automatically so that the vehicle speed is maintained at a substantially constant value, typically in excess of 30 kph. In other words, the cruise control system is ineffective at speeds lower than 30 kph. The cruise control HMI 18 may also be configured to provide an alert to the user about the status of the cruise control system 16 via a visual display of the HMI 18. When the cruise control system 16 is operational, an intervention from DCS, SCS, or other brake actioned systems that assist in maintaining the vehicle on the desired path, causes the cruise control system to either be cancelled or deactivated, i.e. placed in a standby mode, to prevent further positive torque requests being issued. This is done for safety as an intervention from one of the aforementioned systems is indicative that the vehicle is travelling too fast for adequate traction as the vehicle corners. The LSP control system 12 provides a speed-based control system for the user which enables the user to select a relatively low target speed at which the vehicle can progress without any pedal inputs being required by the user. This low-speed progress control function is not provided by the on-highway cruise control system 16 which operates only at speeds above 30 kph. Known on-highway cruise control systems including the present system 16 are configured so that, in the event that the user depresses the brake or the clutch, the cruise control function is cancelled and the vehicle 100 reverts to a manual mode of operation which requires user pedal input to maintain vehicle speed. In addition, detection of a wheel slip event, as may be initiated by a loss of traction, also has the effect of cancelling the cruise control function. In contrast, the LSP control system 12, when controlling vehicle speed, does not cancel in the event a wheel slip event is detected. Instead, the control system 12 may actively manage wheel slip as will be described herein.

The LSP control system 12 is operable to apply selective powertrain, traction control and braking actions to the wheels of the vehicle, collectively or individually, to maintain the vehicle 100 at the desired speed. It is to be understood that if the vehicle 100 is operating in a two wheel drive mode in which only front wheels 111, 112 are driven, the control system 12 may be prevented from applying drive torque to rear wheels 113, 114 of the vehicle 100.

In use, a user inputs the desired target speed to the LSP control system 12 via a low-speed progress control HMI (LSP HMI) 20 (FIG. 1, FIG. 3). The LSP control system 12 operates at vehicle speeds typically below about 50 kph but does not activate until vehicle speed drops to below 30 kph when the cruise control system 16 of the vehicle 100 becomes ineffective.

The LSP control system 12 is configured to operate independently of a traction event, i.e. the system 12 does not cancel speed control upon detection of wheel slip. Rather, the LSP control system 12 actively manages vehicle behaviour and in this way, at least, differs from the functionality of the cruise control system 16, as will be described in further detail below.

The LSP control HMI 20 is provided in the vehicle cabin so as to be readily accessible to the user. The user of the vehicle 100 is able to input to the LSP control system 12, via the LSP HMI 20, an indication of the speed at which the user desires the vehicle to travel (referred to as "the target speed" or "set speed"). The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of a brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20 which is representative of the status of the LSP control function.

The cruise control HMI 18 and the LSP HMI 20 have input controls provided on a steering wheel 171 of the vehicle 100 for convenience of operation by the user.

FIG. 6 shows the steering wheel 171 of the vehicle 100 of FIG. 1 in more detail, together with the accelerator and brake pedals 161, 163. As noted above, the steering wheel 171 bears user operable input controls of the cruise control HMI 18 and LSP control HMI 20. As in the case of a conventional vehicle, the steering wheel 171 has a 'set-speed' control 173, actuation of which enables a user to activate the cruise control system 16 to maintain the current vehicle speed. The wheel 171 also has a 'LSP' control activation button 172 for activating the LSP control system 12 and a resume button 173R. The resume button 173R may be used to control both the 'on-highway' cruise control system 16 when driving on road, and the LSP control system 12 when driving off-road, to resume a previously set (user defined) set-speed.

If the vehicle is operating on-highway, depression of set-speed control 173 causes the cruise control system 16 to activate provided the current vehicle speed is within the operating range of the cruise control system 16. Depression of the '+' control 174 causes the cruise control system 16 to increase the set-speed whilst depression of the '−' control 175 causes the cruise control system 16 to decrease the set-speed. It will be appreciated that '+' and '−' controls may be on a single button in some arrangements, such as a rocker-type button. In some embodiments, the '+' control 174 may function as a 'set-speed' control, in which case set-speed control 173 may be eliminated.

If the vehicle is operating off-highway, depression of set-speed control 173 causes the LSP control system 12 to activate and operate as described above, provided vehicle speed is within the operating range of the LSP control system 12.

In some embodiment, the system may further comprise a 'cancel' button operable to cancel speed control by the LSP control system 12. In some embodiments, the LSP system may be in either one of an active condition or a standby condition. In the present embodiment the LSP control system 12 is also operable to assume an intermediate condition in which vehicle speed control by the LSP control system 12 is suspended but a hill descent control (HDC) system or the like may remain active if already active. In some embodiments, in the intermediate condition the LSP control system 12 is operable to prevent vehicle speed exceeding a prescribed HDC system set-speed unless a driver over-rides the LSP control system 12 means of an accelerator control such as accelerator pedal 161. If the driver does override vehicle speed in this manner, then once the driver releases the accelerator pedal 161 the LSP control system 12 slows the vehicle below the HDC system set speed. The LSP control system 12 and HDC system may cooperate with one another whereby the LSP control system 12 commands the HDC system to control vehicle speed when the LSP control system 12 is in the intermediate condition, whilst the LSP control system 12 suspends application of positive drive torque to accelerate the vehicle 100 or maintain a set-speed. Thus, a set-speed can only be maintained when the LSP control system 12 is in the intermediate condition if the vehicle 100 is descending a sufficiently steep incline under gravity. Other arrangements are also useful.

With the LSP control system 12 active or in the intermediate condition, the user may increase or decrease the vehicle set-speed by means of the '+' and '−' buttons 174, 175. In addition, the user may also increase or decrease the vehicle set-speed by lightly pressing the accelerator or brake pedals 161, 163 respectively. In some embodiments, with the LSP control system 12 active (or in the intermediate condition) the '+' and '−' buttons 174, 175 are disabled. This latter feature may prevent changes in set-speed by accidental pressing of one of these buttons, for example when negotiating difficult terrain where relatively large and frequent changes in steering angle may be required. Other arrangements are also useful.

Figure 4:
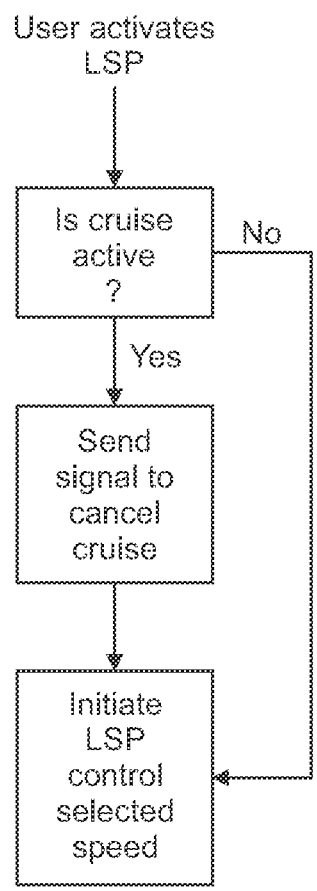
FIG. 4 is a flow diagram to illustrate the interaction between the cruise control system and the low-speed progress control system in FIG. 3.

FIG. 4 shows a flow process to illustrate the interaction between the cruise control system 16 and the LSP control system 12. If cruise control is active when the user tries to activate the LSP control system 12 via the LSP control HMI 20, a signal is sent to the cruise control system 16 to cancel the speed control routine. The LSP control system 12 is then initiated and the vehicle speed is maintained at the target speed selected by the user via the LSP HMI 20. It is also the case that if the LSP control system 12 is active, operation of the cruise control system 16 is inhibited. The two systems 12, 16 therefore operate independently of one another, so that only one can be operable at any one time, depending on the speed at which the vehicle 100 is travelling.

In some embodiments, the cruise control system 16 may hand over vehicle speed control to the LSP control system 12 if a user reduces set-speed of the vehicle 100 to a value within the operating speed range of the LSP control system 12. Similarly, in some embodiments the LSP control system 12 may hand over vehicle speed control to the cruise control system 16 if a user raises vehicle set-speed to a value that is within the operating range of the cruise control system 16. Other arrangements are also useful.

In some embodiments, the cruise control HMI 18 and the LSP control HMI 20 may be configured within the same hardware so that, for example, the speed selection is input via the same hardware, with one or more separate switches being provided to switch between the LSP input and the cruise control input.

Figure 5:
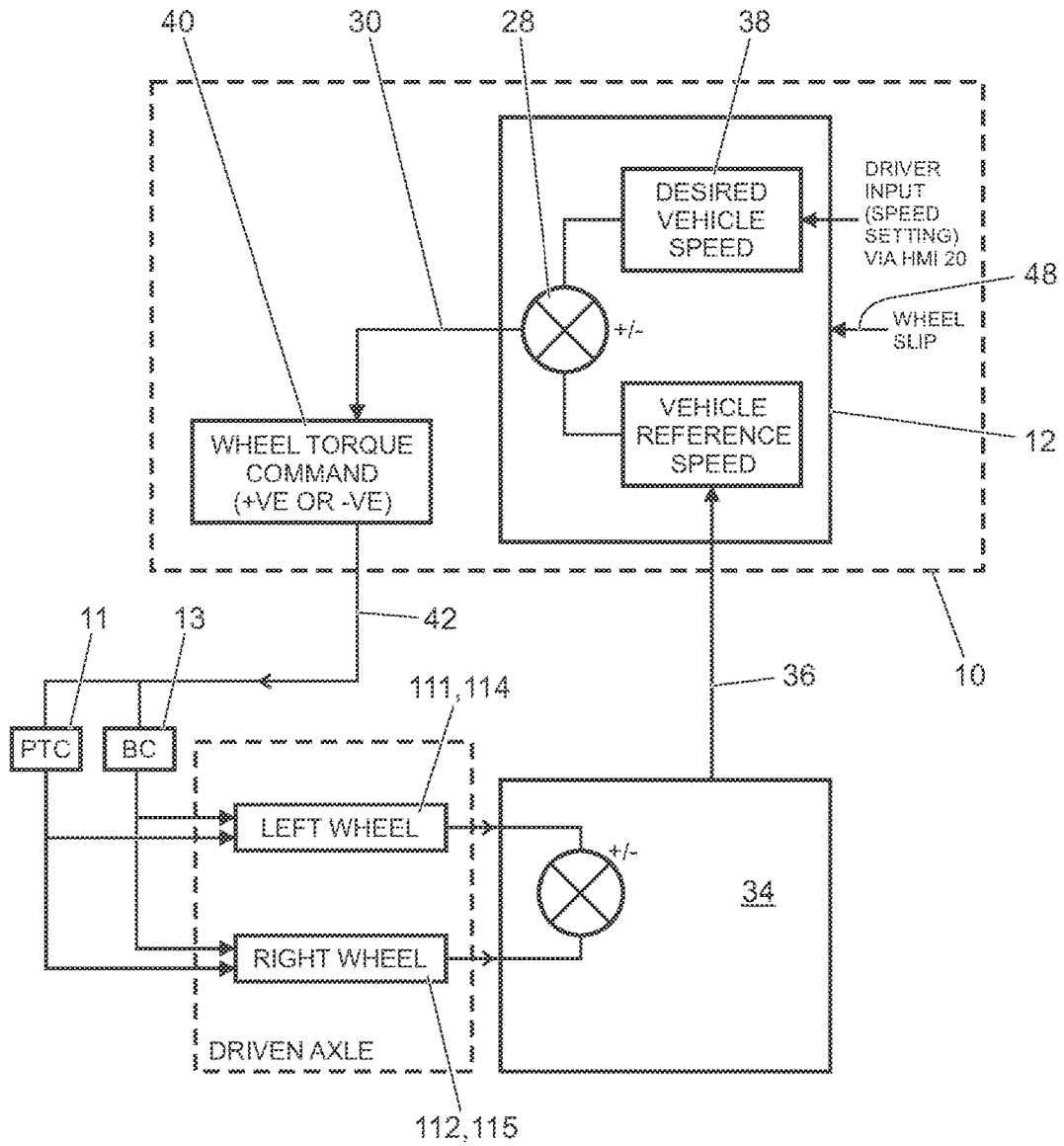
FIG. 5 is a schematic diagram of further features of the vehicle speed control system in FIG. 3.

FIG. 5 illustrates the means by which vehicle speed is controlled in the LSP control system 12. As described above, a speed selected by a user (set-speed) is input to the LSP control system 12 via the LSP control HMI 20. A vehicle speed sensor 34 associated with the powertrain 129 (shown in FIG. 1) provides a signal 36 indicative of vehicle speed to the LSP control system 12. The LSP control system 12 includes a comparator 28 which compares the set-speed (also referred to as a 'target speed') 38 selected by the user with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed that has been selected by the user. An increase in torque is generally accomplished by increasing the amount of powertrain torque delivered to a given position of the powertrain 129, for example an engine output shaft, a wheel or any other suitable location. A decrease in torque to a value that is less positive or more negative may be accomplished by decreasing powertrain torque delivered to a wheel and/or by increasing a braking force on a wheel. It is to be understood that in some embodiments in which a powertrain 129 has an electric machine operable as a generator, negative torque may be applied by the powertrain 129 to one or more wheels. It is to be understood that a brake controller 13 may nevertheless be involved in determining whether brake torque is required to be provided by an electric machine of a powertrain 129, and whether brake torque should be provided by an electric machine or a friction-based foundation braking system 22.

An output 42 from the evaluator unit 40 is provided to the powertrain controller 11 and brake controller 13 which in turn control a net torque applied to the vehicle wheels 111-115. The net torque may be increased or decreased depending on whether there is a positive or negative demand for torque from the evaluator unit 40. Thus, in order to initiate application of the necessary positive or negative torque to the wheels, the evaluator unit 40 may command that additional power is applied to the vehicle wheels and/or that a braking force is applied to the vehicle wheels, either or both of which may be used to implement the change in torque that is necessary to maintain the target vehicle speed. In the illustrated embodiment the torque is applied to the vehicle wheels individually so as to maintain the target vehicle speed, but in another embodiment torque may be applied to the wheels collectively to maintain the target speed.

In the present embodiment the powertrain controller 11 is operable to control an amount of torque applied to each driven wheel of the vehicle 100. The powertrain controller 11 is operable to command the rear drive unit 135 to control a distribution of torque between respective rear driveshafts 139L, 139R. The rear drive unit 135 includes a pair of clutches operable to couple respective left and right rear driveshafts 139L, 139R to the prop-shaft 132. An amount of torque transmitted from the prop-shaft 132 to each driveshaft 139L, 139R may be controlled by means of the clutches. Other arrangements are also useful. For example, the rear drive unit 135 may in some embodiments be replaced by a differential gearbox arrangement. In this case, control of relative amounts of torque distributed to left and right rear wheels 114, 115 may be controlled by application of brake torque commanded by brake controller 11.

A distribution of torque between respective front driveshafts 118 is performed by commanding application of drive positive drive torque in combination with brake torque by means of the brake controller 13. In the present embodiment, the VCU 10 may command application of brake torque and drive torque by communicating with the powertrain controller 11 and brake controller 13.

Where a powertrain 129 includes one or more electric machines, for example one or more propulsion motors and/or generators, the powertrain controller 11 may be operable to modulate the amount of torque applied to one or more wheels by means of the one or more electric machines. In some embodiments, the one or more electric machines may be operable as propulsion motors or generators under the control of the powertrain controller 11. Thus the powertrain controller 11 may in some embodiments be controlled to apply more positive or more negative torque to one or more wheels by means of an electric machine.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 16 so that automatic control of the vehicle speed by the on-highway cruise control system 16 is suspended or cancelled. However, the LSP control system 12 is not arranged to cancel or suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the desired vehicle speed as input by the user, and continues to control automatically the torque applied across the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or the cruise control function reset.

A further embodiment of the invention (not shown) is one in which the vehicle is provided with a wheel slip signal 48 derived not just from a comparison of wheel speeds, but further refined using sensor data indicative of the vehicle's speed over ground. Such speed over ground determination may be made via global positioning (GPS) data, or via a vehicle mounted radar or laser based system arranged to determine the relative movement of the vehicle and the ground over which it is travelling. A camera system may be employed for determining speed over ground in some embodiments.

At any stage of the LSP control process the user can override the function by depressing the accelerator pedal 161 and/or brake pedal 163 to adjust the vehicle speed in a positive or negative sense. However, in the event that a wheel slip event is detected via signal 48, the LSP control system 12 remains active and control of vehicle speed by the LSP control system 12 is not suspended. As shown in FIG.

5, this may be implemented by providing a wheel slip event signal 48 to the LSP control system 12 which is then managed by the LSP control system 12. In the embodiment shown in FIG. 1 the SCS 14 generates the wheel slip event signal 48 and provides it to the LSP control system 12 and cruise control system 16.

A wheel slip event is triggered when a loss of traction occurs at any one of the vehicle wheels. Wheels and tyres may be more prone to losing traction when travelling on snow, ice or sand and/or on steep gradients or cross-slopes, for example, or in environments where the terrain is more uneven or slippery compared with driving on a highway in normal on-road conditions. Embodiments of the present invention therefore find particular benefit when the vehicle is being driven in an off-road environment, or in conditions in which wheel slip may commonly occur. Manual operation by the user in such conditions can be a difficult and often stressful experience and may result in an uncomfortable ride. Embodiments of the present invention enable continued progress to be made at a relatively low target speed without the need for user intervention.

The vehicle 100 is also provided with additional sensors (not shown) which are representative of a variety of different parameters associated with vehicle motion and status. These may be inertial systems unique to the speed control system or part of an occupant restraint system or any other subsystem which may provide data from sensors such as gyros and/or accelerometers that may be indicative of vehicle body movement and may provide a useful input to the LSP control system 12. The signals from the sensors provide, or are used to calculate, a plurality of driving condition indicators (also referred to as terrain indicators) which are indicative of the nature of the terrain conditions over which the vehicle is travelling. The signals are provided to the VCU 10 which determines the most appropriate control mode for the various subsystems on the basis of the terrain indicators, and automatically controls the subsystems accordingly. This aspect of the invention is described in further detail in our co-pending patent application nos. GB2492748, GB2492655 and GB2499279, the contents of each of which is incorporated herein by reference.

The sensors (not shown) on the vehicle include, but are not limited to, sensors which provide continuous sensor outputs to the VCU 10, including wheel speed sensors, as mentioned previously and as shown in FIG. 5, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor which may be part of the stability control system (SCS), a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the controller 170C.

The VCU 10 evaluates the various sensor inputs to determine the probability that each of a plurality of different control modes for the vehicle subsystems is appropriate, with each control mode corresponding to a particular terrain type over which the vehicle is travelling (for example, mud and ruts, sand, grass, gravel, snow). The VCU 10 then selects which of the control modes is most appropriate and controls various vehicle parameters accordingly.

The nature of the terrain over which the vehicle is travelling (as determined by reference to the selected control mode) may also be utilised in the LSP control system 12 to determine an appropriate increase or decrease in drive torque to be applied to the vehicle wheels. For example, if the user selects a target speed that is not suitable for the nature of the terrain over which the vehicle is travelling, the system 12 is operable automatically to adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed that differs from the user-selected set-speed (i.e. target speed), a visual indication of the speed constraint is provided to the user via the LSP HMI 20 to indicate that an alternative (lower) speed has been adopted.

As described above, the LSP control system 12 is operable to command a required amount of torque to be applied to one or more driven wheels of the vehicle 100 in order to cause the vehicle to travel at the user-selected set-speed. If whilst the LSP control system 12 is active the driver depresses the accelerator pedal 161 to demand additional powertrain torque above the amount currently demanded by the LSP control system 12, driver torque demand takes priority and the powertrain 129 is controlled so as to meet driver demand. In the present embodiment, if driver demand exceeds that demanded by the LSP control system 12, the LSP control system 12 remains active, i.e. the LSP control system 12 continues to calculate an amount of powertrain torque and brake torque that the powertrain controller 11 and brake controller 13 should command be applied to the driven wheels of the vehicle 100 in order to travel at the set-speed. In this way, once a driver releases the accelerator pedal 161, the LSP control system 12 resumes control of vehicle speed.

It is to be understood that the LSP control system 12 may command the required amount of torque by generating a value of a torque parameter. The powertrain controller 11 may be configured to develop the required amount of torque depending on the value of this torque parameter, which may have a value that corresponds to the required amount of torque without necessarily being equal to the amount of required torque. Thus, for example, the LSP control system 12 may generate a code, such as a number such as 10020, which may correspond to a required powertrain torque of 150 Nm, different codes being generated for different required amounts of powertrain torque. In response to receipt of a command to generate powertrain torque at a level of (say) code 10020, the powertrain controller 11 may therefore control the powertrain 11 to generate 150 Nm of torque. Other arrangements are also useful.

As described above, the LSP control system 12 may command the powertrain 129 to develop a required amount of torque at a given location, such as at an output shaft of the engine 121, at an input shaft of the transmission 124, an output shaft of the transmission 124, a wheel or any other suitable location. It is to be understood that if the LSP control system 12 is arranged to control the powertrain 129 to apply a given amount of torque at a location other than a wheel, such as an output shaft of the engine 121, the torque delivered at a wheel may be calculated based on a gear ratio between the engine output shaft and wheel. The control system 12 may be operable to command the powertrain 129 to establish a given gear ratio between a given position of the powertrain 129 and wheel, so as to establish a desired torque at the wheel. Thus, whilst the LSP control system 12 commands the powertrain to generate a given amount of torque at a given position (and may command the generation of given amounts of torque at a plurality of locations, particularly in a powertrain 129 having a plurality of motors such as an engine and an electric propulsion motor), the LSP control system 12 may also be operable to ensure that the torque delivered to a wheel is a required value by suitable control of the gear ratio. Other arrangements are also useful. In some embodiments, the LSP control system 12 may be provided with data corresponding to a gear ratio between a given position of the powertrain 129 and one or more wheels, and command application of an amount of torque to the given position of the powertrain 129 so as to obtain a required amount of torque at the one or more wheels.

Figure 7:
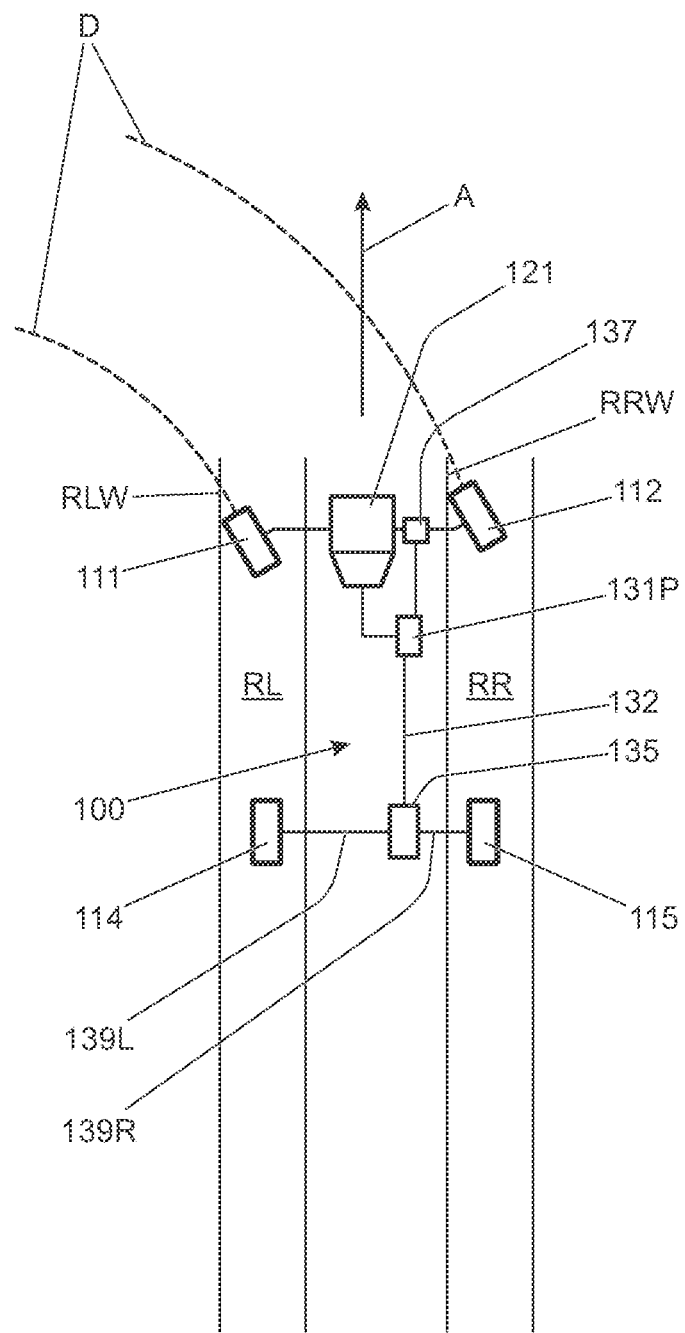
FIG. 7 illustrates a vehicle attempting to exit a pair of parallel ruts in which respective left and right-hand wheels are trapped.

When negotiating off-road terrain, a vehicle may encounter a situation in which one or more wheels are following a rut. In some situations, left and right wheels may follow respective substantially parallel ruts that may have been formed by one or more previous vehicles that have negotiated the route. FIG. 7 illustrates a scenario in which the vehicle 100 of FIG. 1 is following a track defined by a pair of ruts RL, RR. Left hand front and rear wheels 111, 114 of the vehicle 100 are following a left-hand rut RL while right hand front and rear wheels 112, 115 are following a right-hand rut RR.

In some situations, once a vehicle is following a route defined by one or more ruts with left and/or right hand wheels within a rut, a driver may experience difficulty controlling the vehicle to exit the one or more ruts, particularly where the terrain is relatively slippery. When the driver turns the steering wheel to one side to drive the vehicle out of the ruts, the leading road wheels (typically steerable road wheels in the case of a conventional vehicle travelling in a forward direction) may fail to gain traction against a sidewall of the ruts. This may result in understeer, in which a curvature of a path followed by the vehicle is less than that corresponding to the steering angle. In the example of FIG. 7, the vehicle is moving in the direction of arrow A (in a substantially straight line) despite a steerable road wheel angle that is set such that respective left and right steerable wheels 111, 112 should follow paths corresponding to dashed lines D.

A similar understeer situation may occur if a driver seeks to steer a vehicle off a road or track bounded by raised ground where a coefficient of friction between the wheels and driving surface is relatively low.

Embodiments of the present invention are arranged to overcome this problem by controlling a distribution of torque between wheels of the vehicle in order to induce a turning moment on the vehicle 100.

In the vehicle 100 of FIG. 1 the VCU 10 is operable to implement a steering assist function. The steering assist function may be activated manually by a user by means of a steering assist button 170B. In addition, the steering assist function may be activated automatically by the LSP control system 12 in the event the LSP control system 12 is controlling vehicle speed and certain predetermined conditions are met.

When the steering assist function is activated, the VCU 10 is configured to monitor a steering position of the steering wheel 171 and to determine repeatedly an expected rate of turn of the vehicle 100 for the current steering wheel position. The VCU 10 compares the expected rate of turn with data in respect of an actual rate of turn of the vehicle 100 obtained from a yaw rate sensor. The VCU 10 determines a value of an error parameter corresponding to the amount by which the actual rate of turn of the vehicle 100 differs from the expected rate of turn. If the actual rate of turn is less than the expected rate of turn by more than a prescribed amount, the VCU 10 commands the powertrain controller 11 and brake controller 13 to apply respective amounts of powertrain torque and brake torque to induce a turning moment to reduce the error between actual and expected rates of turn. It is to be understood that the SCS portion of the VCU 10 may be employed to monitor expected rate of turn for the current steering position as described above, and optionally subsequently to cause the powertrain controller 11 and brake controller 13 to control powertrain torque and brake torque to induce the turning moment. Other arrangements are also useful.

In the present embodiment, the VCU 10 commands powertrain controller 11 to reduce drive torque to an inside trailing wheel of the vehicle 100. That is, a trailing wheel on an inside of a direction of attempted turn of the vehicle 100. In the case of the vehicle 100 shown in FIG. 7 moving in a forward direction, the leading wheels are the steerable road wheels 111, 112 whilst the trailing wheels are the rear wheels 114, 115. The inside trailing wheel for the manoeuvre illustrated is the left-hand rear wheel 114.

In response to the command from the VCU 10 to reduce drive torque to the inside trailing wheel (wheel 114 in the scenario illustrated in FIG. 7), the powertrain controller 11 reduces the amount of torque transmitted by rear drive unit (RDU) 135 to the inside trailing wheel 114 whilst maintaining the amount of torque transmitted to the outside trailing wheel (right-hand road wheel 115 in the manoeuvre of FIG. 7) substantially constant. In some embodiments the powertrain controller 11 may command an increase or a decrease in the amount of torque transmitted to the outside trailing wheel 115, provided that a net turning moment on the vehicle in the direction of intended turn is established by the trailing wheels 114, 115.

The VCU 10 may in addition or instead command application of brake torque to one or both trailing wheels 114, 115 by means of brake controller 13 in order to control the amount of torque applied to the respective trailing wheels 114, 115.

By inducing a turning moment on the vehicle 100 by means of controlled torque application at the trailing wheels 114, 115, a force exerted on sidewalls of the ruts RL, RR by the leading wheels 111, 112 is increased, increasing an amount of grip of the leading wheels 111, 112 on the driving surface. In some situations the leading wheels 111, 112 may as a consequence be better able to cut into the ruts and gain a larger 'foot print'. That is, the leading wheels 111, 112 may be able to increase a surface area thereof in contact with the sidewall of the ruts 111, 112 and increase an amount of grip that may be achieved.

It is to be understood that, by applying positive drive torque (which may be of a reduced value and yet still of a positive value) to an inside wheel to rotate the wheel and in addition a braking torque acting against driving torque, the wheel can provide tractive force as well as inducing a turning moment due to a difference in tractive force between inside and outside wheels. Furthermore, since brake torque can typically be modulated relatively quickly and precisely, the use of brake torque in combination with powertrain torque may enable more precise control of net drive torque. This feature may increase vehicle composure and driver confidence in the vehicle 100.

As noted above, relative torque adjustment between trailing wheels may be accomplished by means of an RDU 135 with twin clutch arrangement. Other methods are also useful in vehicles not having such a unit. For example, in the case of a vehicle having an open differential gear arrangement, relative torque adjustment may be accomplished by braking the wheel at which torque reduction is required. This may result in a corresponding increase in drive torque to the wheel on the opposite side of the differential.

As noted above, the steering assist function may be activated by means of steering assist button 170B, or automatically by the LSP control system 12. In some embodiments, when the steering assist function is active, the VCU 10 repeatedly detects steering angle and controls a distribution of torque to one or more wheels of the vehicle in dependence on the detected steering angle thereby to induce a turning moment in the direction of turn indicated by the steering angle independently of whether understeer is present. Thus, in some embodiments, when active the steering assist function does not induce the turning moment only when understeer having a severity exceeding a prescribed threshold is detected. As described hereinabove different thresholds may be applied to different terrains, to different driving style modes, or to different speed control modes of operation.

In the present embodiment, if the LSP control system 12 is controlling vehicle speed, the LSP control system 12 repeatedly checks steering angle (in the present embodiment by reference to steerable road wheel angle) and actual rate of turn of the vehicle 100. Steerable road wheel angle is monitored by reference to a signal generated by steering controller 170C, whilst rate of turn is monitored by reference to a signal indicative of lateral acceleration and a signal indicative of vehicle speed. In some embodiments each of these signals are received by the VCU 10 via a controller area network (CAN) bus. Other arrangements are also useful. In some embodiments a location determining apparatus is employed to determine rate of turn, for example a global positioning system (GPS) receiver or other location determining apparatus.

If the LSP control system 12 determines that a sufficiently large error exists between steerable road wheel angle and actual rate of turn of the vehicle 100, the system 12 may cause the steering assist function to become active.

As described above, in the present embodiment, once the steering assist function is active the VCU 10 repeatedly determines the value of the error parameter corresponding to the amount by which the actual rate of turn of the vehicle 100 differs from the expected rate of turn. If the actual rate of turn is less than the expected rate of turn by more than a prescribed amount, i.e. the amount of understeer exceeds a prescribed amount, the VCU 10 commands the powertrain controller 11 and brake controller 13 to apply respective amounts of powertrain torque and brake torque to induce a turning moment to reduce the error between actual and expected rates of turn.

Once the error value has reduced below a prescribed value for a given period of time (or distance travelled, in some embodiments), the steering assist function may be cancelled.

In addition or instead, operation of the steering assist function may be cancelled once the steering angle falls below a prescribed value. Optionally, in addition or instead, the steering assist function may be cancelled once the steering angle has fallen below a prescribed value for more than a prescribed period of time. Optionally, the steering assist function may be cancelled once the steering angle has fallen below a prescribed value for more than a prescribed distance of travel.

Throughout the period in which the steering assist function is active, the LSP control system 12 remains in control of vehicle speed so that vehicle speed does not exceed the current value of set-speed.

In some embodiments, if the VCU 10 detects that the vehicle 100 has travelled in a substantially straight line with a steering angle exceeding a prescribed value, the VCU 10 may cause the steering assist function to become active. In some embodiments, the steering assist function may control the net torque at each driven wheel progressively to increase a turning moment on the vehicle in the direction of steer. In some embodiments, the VCU 10 controls the net torque so as progressively to decrease a net drive torque on the vehicle by a trailing inside wheel. The VCU 10 may accomplish this by decreasing drive torque to a trailing inside wheel and/or increasing brake torque. It is to be understood that some vehicles may have only one trailing inside wheel whilst some vehicles may have a plurality of trailing inside wheels, such as trucks and the like. Net torque to each of the plurality of wheels may be decreased, to only one, or to any required number.

In some embodiments of the present invention, a turning moment on the vehicle due to one or more trailing wheels of the vehicle may be controlled to produce a yaw rate that is less than that corresponding to driver demand as determined by reference to steering angle. This aspect allows drive torque to be kept relatively high although some wheel scrub will be present.

In some embodiments, a turning moment on the vehicle due to trailing wheels of the vehicle may be controlled to produce a yaw rate that is substantially equal to driver demand as determined by reference to steering angle, for example where a driving surface is relatively soft and a weight of the vehicle is sufficient to sink into the surface and prevent the vehicle from following driver intended path.

In some embodiments, control of a turning moment on the vehicle due to trailing wheels of the vehicle may be controlled to produce a yaw rate that is greater than the driver demanded value, where this would enable the vehicle to build up a yaw moment to assist the driver to exit either a rut or a relatively soft surface.

Some embodiments of the present invention may provide a user operable control that allows a user to select a relative amount of steering assistance that will be provided by the steering assist function. In some embodiments the user may select the relative amount of turning moment that the vehicle will seek to generate by means of one or more user input controls.

In some embodiments the one or more user input controls may allow a user to select steering assistance corresponding to a yaw rate that is less than, substantially equal to or greater than driver demanded yaw rate. Other arrangements are also useful.

It is to be understood that embodiments of the present invention are suitable for implementation when a vehicle is moving at speed, for example a speed up to and in some cases exceeding 20 kph over relatively slippery terrain. Even if all driven wheels of the vehicle are experiencing slip an inside trailing wheel may be controlled independently to prioritise steering and not drive. Thus, embodiments of the present invention are considerably more versatile than so-called 'tank steer' systems employed in agricultural vehicles in which relatively harsh braking is applied to inside wheels to lock the wheels whilst outside wheels are driven so as to pivot the vehicle about a substantially fixed point.

It is to be understood that embodiments of the present invention may be employed in vehicles having a range of different types of powertrain, including powertrains having independently controllable sources of drive torque for each wheel, such as electric machines or other sources. In the case of certain sources such as electric machines, the torque sources may be operable to provide positive or negative (braking) torque independently of one another as required.

It is to be understood that some embodiments of the present invention are operable to employ control of rear axle braking as a proportion of steering angle and accelerator pedal position to enable an effective yaw moment to be induced to assist a vehicle in climbing the side wall of a rut in which a wheel has become stuck.

Embodiments of the present invention may trigger a torque control system such as a traction control system (TCS) and a driveline disconnect system to control drive torque, optionally in combination with a braking system. A steering system such as an electronic power assisted steering system (ePAS) may be employed to angle steerable road wheels at an optimum side wall angle for climbing the rut.

In one embodiment, a steering assistance system may be provided that is configured to detect when a vehicle passes the same section of a track more than once with a steering angle of more than a prescribed value, for example a value corresponding to a steering wheel rotation of substantially 360 degrees or more with respect to a neutral straight-ahead position. Other values of wheel rotation (or steerable road wheel angle) are also useful. The system may then check data in respect of lateral acceleration, yaw rate and roll rate of the vehicle to identify a location at which the most progress has been made in climbing the rut wall. The system may then configure the vehicle in such a manner as to improve the prospect of climbing out of the one or more ruts at this location.

If a relatively high level of wheel slip is present at a front axle, drive torque to the inside trailing wheel may be reduced, optionally withheld (for example by disconnecting the inside trailing wheel from a source of drive torque) in order to induce (or increase) a turning moment on the vehicle. Brake proportioning may also be employed to assist turning of the vehicle. Thus, brake torque may be applied selectively to one or more inside wheels, for example an inside trailing wheel only. In addition, engine torque may be reduced to control wheel slip to a level where more grip is available.

In one example, wheel slip may be allowed to develop at one or more leading wheels in contact with the wall of the rut in order to 'cut' into the wall of the rut, whilst rear wheels are controlled such that a turning moment is induced in order to assist turning of the vehicle, and exit from the rut. Other arrangements are also useful.

The feature of inducing a turning moment at relatively low vehicle speeds may be employed when appropriate when a vehicle is operating in a particular driving mode such as a mode optimised for driving over a particular terrain type, such as muddy terrain and/or in ruts, and/or a mode optimised for driving over sand.

Terrain type may be detected automatically by an on-board vehicle system and a corresponding driving mode selected, or may be manually selected by a vehicle driver based on visual appearance of terrain.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control system for a vehicle, the control system operable in a steering assist mode in which the system is configured to:
   detect a steering angle;
   detect or predict a side slip event of the vehicle; and
   if the detected or predicted side slip event exceeds a threshold value, control a distribution of torque to one or more wheels of the vehicle in dependence on the detected steering angle thereby to induce a turning moment in the direction of turn indicated by the steering angle, wherein the threshold value is dependent upon a terrain mode in which the vehicle is operating.

2. The system according to claim 1 operable in a first speed control mode in which the system automatically causes the vehicle to travel at a speed in dependence upon a value of a set-speed parameter corresponding to a speed the vehicle is to be intended to maintain, and the system continues to operate in the first speed control mode during the distribution of torque by said system.

3. The system according to claim 2 operable to select the steering assist mode automatically when the system assumes the first speed control mode.

4. The system according to claim 2 wherein the value of the set-speed parameter is set by a user.

5. The system according to claim 2 operable is a second alternative speed control mode in which the control a distribution of torque to one or more wheels of the vehicle in dependence on the detected steering angle thereby to induce a turning moment in the direction of turn indicated by the steering angle, causes a cancellation of the second speed control mode.

6. The system according to claim 2 wherein the first speed control mode controls the speed within a first range of set speeds and wherein the second speed control mode controls the speed of the vehicle within a second range of set speeds.

7. The system according to claim 1 operable to allow a user to select and deselect the steering assist mode.

8. The system according to claim 1 operable automatically control said distribution of torque:
   in dependence on a correspondence parameter threshold between steering angle and a current rate of turn of the vehicle;
   when a difference between rate of turn and expected rate of turn for a given steering angle exceeds a prescribed threshold over a prescribed threshold distance of travel; and/or when a difference between rate of turn and expected rate of turn for a given steering angle exceeds a prescribed threshold for a prescribed threshold time period.

9. The system according to claim 8 wherein the values of said thresholds are different in the first speed control mode and in the second speed control mode, or
wherein the values of the thresholds are different in a first mode of operation in which the vehicle is configured for off-highway driving, and in a second mode of operation in which the vehicle is configured for off-highway driving.

10. The system according to claim 1 operable to control the distribution of torque in dependence on the detected steering angle:
by reducing an amount of net torque applied to an inside wheel with respect to a direction of intended turn; and/or
by reducing an amount of net torque applied to an inside trailing wheel with respect to a direction of intended turn.

11. The system according to claim 1 operable to control the distribution of torque in dependence on the detected steering angle at least in part by reducing an amount of positive drive torque applied to an inside wheel with respect to a direction of intended turn, and
the system is operable to control the distribution of torque in dependence on the detected steering angle at least in part by reducing an amount of positive drive torque applied to an inside trailing wheel.

12. The system according to claim 11 operable to control the distribution of torque in dependence on the detected steering angle at least in part by reducing the amount of positive drive torque applied to an inside wheel and applying a braking torque thereto.

13. The system according to claim 1 operable to control the distribution of torque in dependence on the detected steering angle at least in part by application of brake torque to an inside wheel, and the system is operable to control the distribution of torque in dependence on the detected steering angle at least in part by application of brake torque to an inside trailing wheel.

14. The system according to claim 1 operable to detect when a vehicle has passed the same portion of a route more than once with a steering angle exceeding a prescribed value with respect to a direction of travel of the vehicle, the system being operable to provide an indication to a driver of a location along said portion of the route at which an amount of understeer was reduced relative to other locations of said route when the vehicle previously negotiated that portion, and the system is operable to provide said indication only if the system detects that the vehicle is negotiating that portion of the route within a prescribed time period of the previous occasion.

15. A vehicle comprising the control system according to claim 1.

16. A method of controlling a motor vehicle comprising:
detecting a steering angle;
detecting or predicting a side slip event of the vehicle; and
if the detected or predicted side slip event exceeds a threshold value, controlling, via an electronic control unit, a distribution of torque to one or more wheels of the vehicle in dependence on the detected steering angle thereby to induce a turning moment in the direction of turn indicated by the steering angle, wherein the threshold value is dependent upon a terrain mode in which the vehicle is operating.

17. The method according to claim 16 comprising:
operating the vehicle in a first speed control mode in which the vehicle is automatically controlled to travel at a speed in dependence upon a value of a set-speed parameter corresponding to a speed the vehicle is to be intended to maintain, and comprising continuing to operate in the first speed control mode during the steering angle based distribution of torque by said system.

18. The method according to claim 17 comprising operating the vehicle in a second alternative speed control mode in which the control a distribution of torque to one or more wheels of the vehicle in dependence on the detected steering angle thereby to induce a turning moment in the direction of turn indicated by the steering angle, causes a cancellation of the second speed control mode.

19. A non-transitory carrier medium carrying computer readable code for controlling a vehicle to carry out a method, comprising:
detecting a steering angle;
detecting or predicting a side slip event of the vehicle; and
if the detected or predicted side slip event exceeds a threshold value, controlling a distribution of torque to one or more wheels of the vehicle in dependence on the detected steering angle thereby to induce a turning moment in the direction of turn indicated by the steering angle, wherein the threshold value is dependent upon a terrain mode in which the vehicle is operating.

20. The method according to claim 16, further comprising varying the threshold value in response to a detected change in the terrain mode.

* * * * *